(12) United States Patent
Shelestak et al.

(10) Patent No.: US 8,901,021 B2
(45) Date of Patent: Dec. 2, 2014

(54) DARK PRIVACY GLASS

(75) Inventors: Larry J. Shelestak, Bairdford, PA (US); James P. Thiel, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 366 days.

(21) Appl. No.: 13/026,399

(22) Filed: Feb. 14, 2011

(65) Prior Publication Data
US 2012/0207995 A1    Aug. 16, 2012

(51) Int. Cl.
*C03C 3/087* (2006.01)
*C03C 4/02* (2006.01)
*C03C 3/11* (2006.01)

(52) U.S. Cl.
CPC . *C03C 4/02* (2013.01); *C03C 3/087* (2013.01); *C03C 3/11* (2013.01)
USPC .............................................. 501/71; 501/70

(58) Field of Classification Search
USPC .......................................................... 501/71
See application file for complete search history.

(56) References Cited

U.S. PATENT DOCUMENTS

| | | | |
|---|---|---|---|
| 3,498,806 A | 3/1970 | Hammer et al. | |
| 4,381,934 A | 5/1983 | Kunkle et al. | |
| 4,792,536 A | 12/1988 | Pecoraro et al. | |
| 4,798,616 A | 1/1989 | Knavish et al. | |
| 5,023,210 A * | 6/1991 | Krumwiede et al. | 501/71 |
| 5,352,640 A | 10/1994 | Combes et al. | |
| 5,380,685 A * | 1/1995 | Morimoto et al. | 501/71 |
| 5,393,593 A | 2/1995 | Gulotta et al. | |
| 5,545,596 A | 8/1996 | Alvarez Casariego et al. | |
| 5,650,365 A * | 7/1997 | Higby et al. | 501/71 |
| 5,726,109 A * | 3/1998 | Ito et al. | 501/71 |
| 5,837,629 A | 11/1998 | Combes et al. | |
| 5,877,102 A * | 3/1999 | DuPont et al. | 501/71 |
| 5,905,047 A * | 5/1999 | Sasage et al. | 501/71 |
| 5,998,316 A * | 12/1999 | Seto et al. | 501/71 |
| 6,413,893 B1 * | 7/2002 | Shelestak et al. | 501/71 |
| 6,436,860 B2 * | 8/2002 | Seto et al. | 501/71 |
| RE37,998 E | 2/2003 | Combes et al. | |
| 6,673,730 B1 | 1/2004 | Shelestak | |
| 6,927,186 B2 | 8/2005 | Hulme et al. | |
| 6,953,759 B2 * | 10/2005 | Landa et al. | 501/71 |
| 2001/0011057 A1 | 8/2001 | Seto et al. | |
| 2003/0078155 A1 * | 4/2003 | Landa et al. | 501/71 |
| 2003/0083188 A1 | 5/2003 | Seto et al. | |
| 2004/0110624 A1 | 6/2004 | Hulme et al. | |
| 2007/0079564 A1 | 4/2007 | DiMario et al. | |
| 2007/0191208 A1 * | 8/2007 | Teyssedre et al. | 501/71 |
| 2008/0081148 A1 | 4/2008 | Bond | |

FOREIGN PATENT DOCUMENTS

| | | |
|---|---|---|
| EP | 0 705 800 B1 | 3/1998 |
| EP | 1 081 107 A | 3/2001 |

OTHER PUBLICATIONS

International Standard ISO 13837, Road Vehicles—Safety Glazing Materials—Method for the Determination of Solar Transmittance, First Edition Apr. 15, 2008 , Reference No. ISO 13837:2008(E).
U.S. Appl. No. 12/911,189, filed Oct. 25, 2010, Benjamin Kabagambe et al.
PCT International Search Report, PCT/US2012/022827, dated Apr. 17, 2012.

* cited by examiner

*Primary Examiner* — Anthony J Green
*Assistant Examiner* — Elizabeth A Bolden
(74) *Attorney, Agent, or Firm* — Andrew C. Siminerio

(57) ABSTRACT

A vehicle roof window includes an uncoated glass transparency having an Lta in the range of greater than 0% to 10%, and a solar factor in the range of equal to or less than 30%, measured at a thickness in the range of 3.6-4.1 millimeters ("mm"), e.g. at a thickness of 3.6 mm, 3.9 mm or 4.1 mm. The solar factor is determined in accordance to International Organization for Standardization ("ISO") No. 13837.

17 Claims, 1 Drawing Sheet

DARK PRIVACY GLASS

BACKGROUND OF THE INVENTION

1. Field of the Invention

This invention relates to a dark privacy glass having a low solar factor, and more particularly, to vehicle windows, e.g. automotive roof windows made using the dark privacy glass, the windows having a solar factor equal to or below 30% calculated in accordance to the International Organization for Standardization ("ISO") No.13837.

2. Discussion of the Technical Challenge

There is continued interest in reducing the load applied to vehicle engines, e.g. automotive gasoline engines to increase the miles per gallon of gasoline and to reduce the carbon monoxide exhausted from the engines. Of particular interest in the present discussion are the imposed and the proposed regulations of the Federal Clean Air Act and of the California Air Resources Board ("CARB") directed to vehicle windows, e.g. automotive windows to reduce solar energy passing through the windows to reduce solar heating of the vehicle interior. As is appreciated by those skilled in the art, reducing solar heating of the vehicle interior, especially during the summer months reduces the air conditioner load on the engine. The proposed CARB regulation includes regulations directed to the automotive roof window and requires that the transparency of the roof window, e.g. the glass transparency have a solar factor of a specified value determined according to International Organization for Standardization ("ISO") No,13837. As is appreciated by those skilled in the art, the automotive roof window can be securely mounted in the roof or can be mounted in the roof for reciprocating movement between an open position and a closed position. Further automotive roof windows are also referred to as sun windows and moon windows.

The solar factor is a measure of the percent of solar energy or heat that passes through the glass transparency, e.g. the roof window into the car interior. The lower the solar factor, the higher the solar protection and the higher the performance of the glass transparency in preventing passage of solar energy into the vehicle interior. Using a solar control glass transparency can reduce the need for air-conditioning, thereby reducing air pollution and increasing miles per gallon of fuel.

The formula for calculating the solar factor recited in ISO No. 13837 includes the following variables: total solar energy transmission of the transparency; total solar energy reflectance of the transparency; total solar energy absorbance of the transparency, emissivity of the surfaces of the transparency facing the interior and exterior of the vehicle, speed of the wind moving over the exterior surface of the transparency, thickness of the transparency and heat transfer coefficient of the interior and the exterior surfaces of the transparency. A government, state or municipal agency selects the value of the solar factor. By way of illustration and of interest to the present discussion, CARB has selected a solar factor for transparencies for roof windows of equal to or less than 30%.

As can be appreciated by those skilled in the art, it would be commercially advantageous to provide glass transparencies for vehicle roof windows that meet the solar factor requirement set by the government, state and/or municipal agencies, e.g. but not limiting to the solar factor set by CARB.

SUMMARY OF THE INVENTION

The invention relates to a glass, e.g. a dark privacy glass, including, among other things, a base soda-lime-silica glass portion, and a colorant portion. The colorant portion provides the glass with a solar factor of equal to or less than 30% at a glass thickness in the range of 3.6-4.1 millimeters, wherein the solar factor is calculated in accordance to the International Organization for Standardization No. 13837.

DETAILED DESCRIPTION OF THE INVENTION

Figure 1:
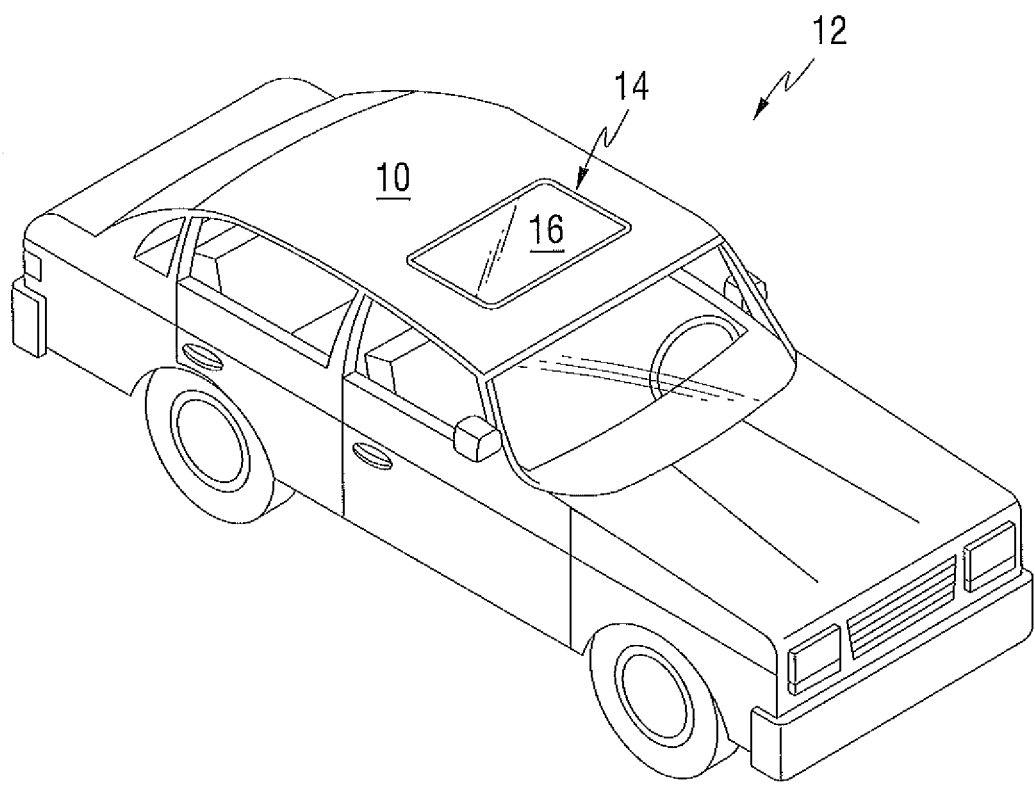
FIG. 1 is plan view of an automobile showing a roof window incorporating features of the invention.

As used herein, unless otherwise expressly specified, all numbers such as those expressing values, ranges, amounts or percentages are read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between and including the recited minimum value of 1 and the recited maximum value of 10, that is, having a minimum value equal to or greater than 1 and a maximum value of equal to or less than 10. As employed herein, the term "number" means one or an integer greater than one.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

The non-limiting embodiments of the invention discussed herein are directed to an automobile roof window having a solar control glass transparency; the invention, however, is not limited thereto. More particularly, the glass transparency can be a part of a window for any type of land, air, space, on the water and under the water vehicle; of any residential or commercial window, and of windows for residential and commercial doors, oven doors and see through refrigerator doors. In addition, the automotive window is not limited to a roof window but can be a vehicle back, or side window. Still further, the roof window is not limited to any particular design and any of the stationary and moveable roof window designs can be used in the practice of the invention With reference to FIGS. 1 and 2 as needed, roof 10 of automobile 12 has a roof window 14 that includes a glass transparency or glass substrate 16. The transparency 16 has a major surface 20 facing the automobile exterior and an opposite major surface 24 facing the automobile interior. The transparency can be securely mounted in the roof for no movement, or mounted in the roof for reciprocating movement between a closed position and an open position. For a discussion of securing a window in a vehicle, reference can be made to U.S. Patent Publication No. U.S. 2007/0079564A1, and for a discussion of a moveably mounting a roof window in a vehicle, reference can be made to U.S. Patent Publication No. U.S. 2008/0081148A1, which documents in their entirety, is hereby incorporated by reference.

At the present time, the solar factor for roof windows proposed by CARB is not adopted and is not mandatory; nevertheless, for a full appreciation of the non-limiting embodiments of the invention, glass transparencies meeting the solar factor for roof windows proposed by CARB will be discussed. The solar factor is equal to or less than 30% calculated in accordance to ISO No. 13837, which document in its entirety is hereby incorporated by reference. Properties of the glass transparency that are used to determine the solar factor include the following: total solar energy transmission (hereinafter also referred to as "TSET") of the glass transparency; total solar energy reflectance (hereinafter also referred to as "TSER') of the glass transparency; total solar energy absorbance (hereinafter also referred to as "TSEA") of the glass transparency, emissivity of the exterior surface 20, and of the interior surface 24, of the glass transparency 16 (see FIG. 2), speed of the wind moving over the exterior surface of the glass transparency, thickness of the glass transparency and heat transfer coefficient of the exterior surface 20 and the interior surface 24 of the glass transparency 16.

For purposes of discussion and not limiting to the invention, in one non-limiting embodiment of the invention, the transparency 16 is a glass transparency or glass substrate and the emissivity of the exterior surface 20 and of the interior surface 24 of the substrate 16 is the same value, and the value of the emissivity is 0.837. The wind speed is 4 meters per second, which is the wind speed of the vehicle at rest as recited in ISO 13837. At 4 meters per second, the heat transfer coefficient of the exterior surface 20 of the substrate 16 is 21 watts/square meter Kelvin and of the interior surface 24 of the substrate 16 is 8 watts/square meter Kelvin. The thickness of the glass substrate 16 is in the range of 3.6-4.1 millimeters ("mm"). In the following discussions of the properties of the non-limiting embodiments of the glasses of the invention, the referenced thickness is 3.9 mm; however, the properties of the non-limiting embodiment of the glasses of the invention can be found in the thickness range of 3.6-4.1 mm. As can be appreciated the invention is not limited to the values set forth for emissivity, wind speed, thickness and heat transfer coefficients, and the values are used with the values of the TSET, TSER, TSEA and solar factor to define the performance of the glass transparency or glass substrate 16 of the invention.

The remaining parameters for determining the solar factor in accordance to ISO 13837, namely TSET, TSER and TSEA, are measured over the wavelength range of 300 to 2500 nanometers ("nm") at a glass transparency thickness of 3.9 mm, For purposes of clarity, the ultraviolet wavelengths are less than 380 nm, the visible wavelengths are in the range of equal to or greater than 380 nm to less than 780 nm, and the infrared wavelengths are equal to or greater than 780 nm. As can be appreciated by those skilled in the art TSET, TSER and TSEA can be measured, or two of the group measured and the third calculated from one of following equations (1)-(3):

$$TSET = 100\% - TSER - TSEA; \quad (1)$$

$$TSER = 100\% - TSEA - TSET; \quad (2)$$

$$TSEA = 100\% - TSET - TSER, \quad (3)$$

where TSET, TSER and TSEA are as defined herein.

TSET is the ratio or percent of total solar energy transmitted through the glass transparency 16 to the amount of total solar energy incident or falling on the exterior surface 20 of the transparency 16. The TSET data provided throughout this disclosure is based on a glass thickness of 3.9 millimeters (0.1535 inch). Total solar energy transmittance (TSET) represents a computed value based on measured transmittances from 300 to 2500 nm at 5 nm, 10 nm, and 50 nm intervals for the UV, visible and IR wavelengths. The transmittance data is calculated using ASTM air mass 1.5 direct solar irradiance data and integrated using the trapezoidal rule, as is known in the art, e.g. as discussed in U.S. Pat. No. 5,393,593, which patent in its entirety is hereby incorporated by reference. In the practice of the invention, the glass transparency 16 at a thickness of 3.9 mm preferably has a TSET of greater than 0% and equal to or less than 5%, and more preferably from 1% to 5%.

The TSER is the ratio or percent of the amount of the total solar energy directly reflected by the exterior surface 20 of the glass transparency 16 and by the interior or second surface 24 of the glass transparency 16 to the amount of total solar energy incident on the exterior surface 20 of the glass transparency 16. As is appreciated by those skilled in the art, the solar energy reflected from the interior or second surface 24 is the solar energy that passes through the exterior surface 24, does not pass through the interior or second surface 24 but is reflected by the interior or second surface 24 toward the exterior surface 20 and passes through the exterior surface 20. For a more detailed discussion of solar rays incident on glass surfaces, reference can be made to U.S. patent application Ser. No. 12/911,189 filed Oct. 25, 2010 in the name of Benjamin Kabagambe et al and titled "Electrocurtain Coating Process for Solar Mirrors", which document in its entirety is hereby incorporated by reference.

In the practice of the invention the TSER of the glass transparency is measured over the wavelength range of 300 to 2500 nm of the electromagnetic scale at a glass thickness of 3.9 mm (0.1535 inches). The reflectance data is calculated using ASTM air mass 1.5 direct solar irradiance data and integrated using the trapezoidal rule, as is known in the art. In the practice of the invention, the glass transparency or glass substrate 16 at a thickness of 3.9 mm preferably has a TSER of greater than 3% and equal to or less than 7%, and more preferably from 3% to 5%.

The TSEA is the ratio or percent of the amount of the total solar energy directly absorbed by the glass transparency 16 to the amount of total solar energy incident on the exterior surface 20 of the transparency 16. In the non-limiting embodiment of the invention under discussion and for purposes of defining the non-limiting embodiment of the invention under discussion, the TSET and TSER of the glass transparency 16 are measured as discussed above, or in any other usual manner, and the TSEA is calculated using equation (3) above. In the practice of the invention, the glass transparency 16 at a thickness of 3.9 mm preferably has a TSEA of greater than 90% and equal to or less than 97%, and more preferably from 92% to 95%.

Reducing the TSET reduces the transmission of solar energy through the glass transparency 16 into the automotive interior, which reduces the transmission of visible light and invisible light into the automotive interior and visa versa. Increasing the TSER increases the reflection of solar energy from the surface 20 of the transparency 16, which reduces the transmission of solar energy, e.g. visible light and invisible light through the transparency 16 into the automotive interior and visa versa. Increasing the TSEA decreases the transmission of solar energy, e.g. visible light and invisible light into the automotive interior and visa versa. As can be appreciated, increasing one of TSET, TSER or TSEA effects the remaining ones of TSET, TSER and TSEA in accordance to above equations (1)-(3).

Figure 2:
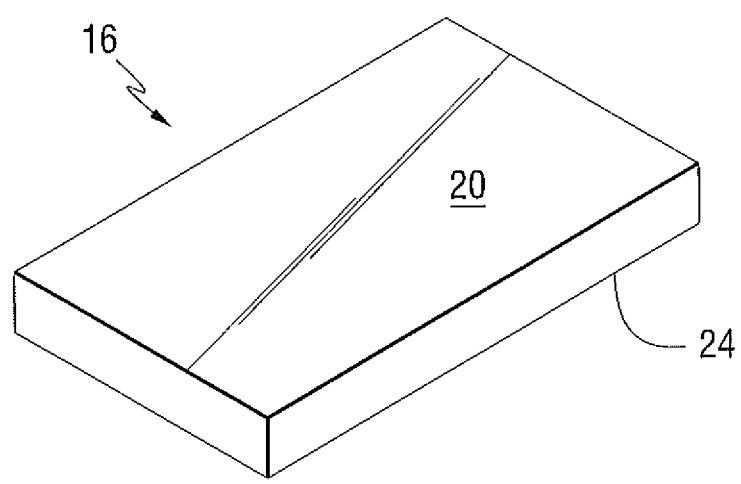
FIG. 2 is a view of non-limiting embodiments of a glass transparency incorporating features of the invention.

The reduction of invisible light, e.g. ultraviolet solar energy and infrared solar energy passing through the glass transparency into the automotive interior is acceptable, however, reduction of visible light into the automotive interior reduces the advantage of having a roof window 14 (see FIG. 1). Although not a required property of the glass transparency to determine the solar factor pursuant to ISO 13837, in the practice of the invention, but not limiting to the invention, the glass transparency 16 at a thickness of 3.9 mm, preferably has a luminous or visible light transmission [2 degree observer] ("Lta") (C.I.E. illuminant A) of greater than 0% and equal to or less than 15%; and more preferably in one or more of the following ranges: greater than 0% to 10%; greater than 0% to 6%; greater than 0% to 5%; greater than 0% to 4%; greater than 0% to 3%; greater than 0% to 2%; greater than 0% to 1%; 1% to 10%; 1% to 6%; 1% to 5%; 1% to 4%; 1% to 3%, and 1% to 2%.

It is noted that luminous transmittance [2 degree observer] ("Lta") (C.I.E. illuminant A) is understood in the art, and is used herein in accordance with its known meaning. This term is also known as "Ill. A" visible transmittance and is in the range of equal to or greater than 380 to less than 780 nm, and its measurements are made in accordance with CIE Publication 15.2 (1986) and ASTM E308. The transmittance data provided throughout this disclosure is based on a glass thickness of 3.9 millimeters (0.1535 inch). Luminous transmittance (Lta) is measured using C.I.E. 1931 standard illuminant "A" over the wavelength range equal to or greater than 380 to 780 nanometers at 10 nanometer intervals.

In the following discussion, unless indicated otherwise the solar factor for glasses of the invention used for glass transparencies is determined according to ISO 13837, using an emissivity of 0.837 for the exterior surface 20, and 0.837 for the interior surface 24, of the glass transparency or glass substrate 16; a wind speed of 4 meters per second over the exterior surface 20 of the glass transparency; a heat transfer coefficient of 21 watts/square meter Kelvin for the exterior surface 20, and a heat transfer coefficient of 8 watts/square meter Kelvin for the interior surface 24, of the glass transparency 16; a glass transparency thickness of 3.9 mm; a measured TSET and TSER, and a TSEA calculated using Equation (3) above.

In the practice of the invention glasses for the glass transparency 16 are soda-lime-silicate glasses having a base glass portion and a colorant portion. In general and not limiting to the invention, the base glass portion includes, but is not limited to:

| | |
|---|---|
| $SiO_2$ | 66-75 weight percent |
| $Na_2O$ | 10-20 weight percent |
| CaO | 5-15 weight percent |
| MgO | 0-5 weight percent |
| $Al_2O_3$ | 0-5 weight percent |
| $K_2O$ | 0-3 weight percent |
| BaO | 0-1 weight percent, and | the colorant portion includes, but is not limited to:

| | |
|---|---|
| total iron as $Fe_2O_3$ | equal to or greater than 0.950 weight percent; |
| FeO | equal to or greater than 0.50 weight percent; |
| CoO | greater than 0.030 weight percent; |
| Redox ratio | equal to or greater than 0.50. |

Any reference to composition amounts, such as "weight percent", "wt %" or "wt. %", "parts per million" and "ppm" are based on the total weight of the final glass composition, or the total weight of the mixed ingredients, e.g. but not limited to the glass batch materials, which ever the case may be. The "total iron" content of the glass compositions disclosed herein is expressed in terms of $Fe_2O_3$ in accordance with standard analytical practice, regardless of the form actually present. Likewise, the amount of iron in the ferrous state (Fe++) is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight percent of total iron (expressed as $Fe_2O_3$). The total amount of iron present in the glass is expressed herein in terms of $Fe_2O_3$ in accordance with standard analytical practice, but that does not imply that all of the iron is actually in the form of $Fe_2O_3$. Unless stated otherwise, the term $Fe_2O_3$ in this specification shall mean total iron expressed in terms of $Fe_2O_3$ and the term FeO shall mean iron in the ferrous state expressed in terms of FeO.

Significant characteristics of the glass of the present invention are relatively high total iron concentration (above 0.950 weight percent) and FeO concentrations in the glass of at least 0.50 weight percent, in some cases up to 0.90 weight percent, and in the most preferred examples between 0.50 to 0.875 weight percent. High total iron reduces luminous transmittance, and high ferrous iron is particularly helpful in reducing infrared transmittance. Melting glass with large amounts of iron is difficult due to poor heat transfer. As a result, when total iron is greater than 1.0 weight percent, generally additional melting enhancements must be provided to insure proper melting, e.g. bubblers and electrodes.

Melting and refining aids such as $SO_3$, fluorine, chlorine, and lithium compounds are sometimes used, and small amounts can be detected in this type of glass. To this base glass are added the coloring constituents of the present invention set forth above. The glass is essentially free of nickel; that is, no deliberate addition of nickel or nickel compounds is made, although the possibility of traces of nickel due to contamination may not always be avoided. Likewise, the glass is essentially free of colorants other than iron and cobalt, and specifically it is essentially free of chromium, titanium, and manganese other than any trace amounts that may be present as impurities. More particularly, amounts of chromium below 0.001 weight percent ("wt %"); amounts of titanium below 0.02 wt % and manganese below 0.003 wt %; are considered trace amounts. Accordingly, the glass of the present invention can be melted and refined in a continuous, large-scale, commercial melting furnace and formed into flat glass sheets of varying thicknesses by the float method in which the molten glass is supported on a pool of molten metal, usually tin, as it assumes a ribbon shape and is cooled.

To avoid requiring unduly large amounts of total iron to meet the objectives of the present invention it is useful to enhance the proportion of iron in the ferrous state. Attaining the ferrous iron levels of the present invention requires controlling the redox conditions during melting so that conditions are relatively reducing. The redox ratio for the glass of the present invention can be maintained at 0.50 to about 0.850, for example, when the total iron concentration is in the preferred concentrations (0.900 to 1.3 wt %). Redox ratios above 0.50 can result in the formation of iron or ferric sulfide, which gives the glass amber coloration. In the preferred practice of the invention, but not limiting to the invention, sulfur expressed as $SO_3$ in the range of 0.04 to 0.10 wt % is preferred, and in the range of 0.05 to 0.09 wt % is more preferred, to enhance the formation of the ferric sulfide complex.

As is appreciated by those skilled in the art redox control is achieved by means of controlling process conditions during the glassmaking process, e.g. using reducing agents such as coal, sugar or hydrocarbon fuel sprayed on batch materials, and increasing movement of the molten glass using stirrers and/or bubblers. Because redox control is well known in the art, no further discuss regarding redox control is deemed necessary. For additional discussions regarding redox control reference can be made to U.S. Pat. Nos. 5,393,593 and 6,673,730, which patents in their entirety are hereby incorporated by reference.

The colorant cobalt produces a blue color, and the colorant iron contributes yellow and blue in varying proportions depending upon the oxidation state. The colorant iron in the ferric state ($Fe_2O_3$) produces a yellow color in transmission and the colorant iron in the ferrous state (FeO) produces a blue color in transmittance. Relatively high concentrations of CoO in this glass help to produce low luminous transmittance and a low TSET.

The glass compositions disclosed in the present invention can be made using any of several types of melting arrangements, such as but not limited to, a conventional, overhead fired continuous melting operation as is well known in the art as the Siemens' process or a multi-stage melting operation as disclosed in U.S. Pat. No. 4,792,536 (Pecoraro et al.), which patent in its entirety, is hereby incorporated by reference.

Conventional, overhead fired continuous melting operations (Siemens' process) are characterized by depositing batch material onto a pool of molten glass maintained within a tank type melting furnace and applying thermal energy until the materials are melted into the pool of molten glass. The melting tanks conventionally contain a large volume of molten glass so as to provide sufficient residence time for currents in the molten glass to affect some degree of homogenization and fining before the glass is discharged into a forming operation. One such operation used for producing glass of the present invention incorporates a refiner and conditioner arrangement as disclosed in U.S. Pat. No. 4,798,616 to Knavish et al., which patent in its entirety, is hereby incorporated by reference. In addition, the waist area includes a waist cooler and a pair of submerged coolers positioned upstream and downstream from a set of stirrers.

Another glass melting and refining operation is disclosed in U.S. Pat. Nos. 4,792,536 and 4,381,934, which patents in their entirety are hereby incorporated by reference. The overall melting process disclosed in U.S. Pat. No. 4,792,536 is characterized by separate stages whereby more flexibility in controlling redox conditions is provided. The three stages include a liquefaction stage, a dissolving stage, and a vacuum refining stage. For a discussion of the three stages, reference can be made to the above-identified patents.

Typically, flat glass batch includes sodium sulfate as a melting and refining aid in the amounts of about 5 to 15 parts by weight per 1000 parts by weight of the silica source material (sand), with about 10 parts by weight considered desirable to assure adequate refining. Soda-lime-silica glass products, particularly flat glass products that are mass-produced by conventional continuous melting processes are characterized by significant amounts of residual refining aids. In such products, the residual sulfur content (expressed as $SO_3$) is typically on the order of 0.2% by weight and seldom less than 0.1% by weight. Even when no deliberate addition of sulfur refining aid is made to the batch, at least 0.02% by weight $SO_3$ is usually detected in a soda-lime-silica glass made in a conventional continuous melter. In distinction thereto, soda-lime-silica glass made in accordance with U.S. Pat. No. 4,792,536 can be produced continuously by the embodiment disclosed in the reference patents with less than 0.02% by weight residual $SO_3$, even when relatively small amounts of sulfur refining aid are being included in the batch as described above, and less than 0.01% by weight $SO_3$ when no deliberate inclusion of sulfur is being made.

Although not limited thereto, the glass of the present invention will most commonly be embodied by a flat sheet suitable for glazing windows of vehicles or buildings. Usually the sheet form will be made by the float process. A sheet of glass that has been formed by the float process (i.e., floated on molten tin) is characterized by measurable amounts of tin oxide that have migrated into surface portions of the glass on at least one side. Typically, a piece of float glass has a $SnO_2$ concentration of at least 0.05 wt % in the first few microns below the surface that was in contact with the tin. In the practice of the invention, any differences between the emissivity and the heat transfer coefficient of the exterior surface 20 and the interior surface 24 as a result of the tin oxide migrating into the surface of the glass is ignored. More particularly, regardless of the air side of the glass facing the interior or the exterior of the vehicle, the value of the emissivity of the exterior surface of the glass and the emissivity of the interior surface of the glass in determining the solar factor pursuant to ISO 13837 is 0.837. The heat transfer coefficient in determining the solar factor pursuant to ISO 13837 of the exterior surface 20 is 21 watts/square meter Kelvin and the heat transfer coefficient of the interior surface is 8 watts/square meter Kelvin.

Twelve (12) Examples of glass compositions at a 3.9 mm (0.1535 in.) reference thickness which embody the principles of the present invention were made in the following manner.

Each of the twelve melts included the raw materials (basic batch mixture) listed in Table 1. To prepare the melts, the raw materials at the parts by weight listed in Table 1 were mixed to produce an Example having a final glass weight of approximately 500 grams.

TABLE 1

| Constituent | Ex. 1-12 |
|---|---|
| Sand | 365 parts by wt. |
| Soda Ash | 117.53 parts by wt. |
| Limestone | 58.4 parts by wt. |
| Dolomite | 65.34 parts by wt. |
| Salt cake | 2.56 parts by wt. |
| Coal | 1.46 to 2.92 parts by wt. |

Rouge and $Co_3O_4$ were added as required for each example to control the glass transmission within the preferred ranges. The amount of rouge was 5.25 to 5.55 parts by wt. The amount of $Co_3O_4$ was 0.1875 parts by wt. Sulfur was added in the form of salt cake, which has the chemical formula $Na_2SO_4$. Coal was added to each melt in various amounts as needed to control glass redox.

A portion of about half of the raw batch material was placed in a silica crucible in an electric furnace and heated to 2450° F. (1343° C.) for 30 minutes. The molten batch was then heated and held at 2500° F. (1371° C.) for 30 minutes. When the batch material melted, the remaining raw materials were added to the crucible. The molten batch was then heated to 2550° F. (1399° C.) for 30 minutes and 2600° F. (1427° C.) for 60 minutes. Next, the molten glass was fritted in water, dried and reheated to 2650° F. (1454° C.) for two hours. The molten glass was then poured out of the crucible to form a slab and annealed. Samples were cut from the slab and ground and polished for analysis.

The major ingredients and ranges of the ingredients of the base glass composition for Examples 1-12 are listed in TABLE 2.

TABLE 2

| | Ex. 1-12 |
|---|---|
| $SiO_2$ | 72.4-73.4 wt % |
| $Na_2O$ | 12.9-13.1 wt % |
| CaO | 9.70-10.43 wt % |
| MgO | 2.58-2.74 wt % |
| $Al_2O_3$ | 0.25-0.28 wt % |

Ingredients of refining aids and tramp materials and their ranges of wt % found in the glass samples 1-12 are listed in TABLE 3.

TABLE 3

| | | | |
|---|---|---|---|
| $K_2O$ | 0.063-0.067 wt % | $ZrO_2$ | 0.01 wt % |
| Cl | 0.014-0.018 wt % | NiO | Less than 0.0010 wt % |
| Se | Less than 0.0003 wt % | $Cr_2O_3$ | 0.0004-0.001 wt % |
| $MnO_2$ | 0.003 wt % | Mo | Less than 0.0005 wt % |
| BaO | Equal to or less than 0.01 wt % | $TiO_2$ | 0.025-0.028 wt % |
| $CeO_2$ | Less than 0.0100 wt % | $SnO_2$ | Less than 0.001 wt % |

Small amounts of these melting and refining aids and tramp materials, usually less than 0.3 wt %, may be present in the glass compositions of the present invention without effect on the properties.

The chemical analysis of the glass compositions of Examples 1-12 was determined by x-ray fluorescence spectroscopy. The spectral characteristics of the glass were determined on annealed samples using a Perkin-Elmer Lambda 9 UV/VIS/NIR spectrophotometer. The FeO content was determined from the transmittance at 1000 nm. The total iron (as $Fe_2O_3$) was determined by x-ray fluorescence. The redox ratio was then calculated as the spectral FeO divided by the total iron (as $Fe_2O_3$).

The colorants and ranges of wt % of examples 1-12 are listed in the following TABLE 4:

TABLE 4

| Examples | Redox $(FeO/Fe_2O_3)$ | Total Iron as $Fe_2O_3$ wt % | $SO_3$ wt % | CoO wt % | FeO wt % |
|---|---|---|---|---|---|
| 1 | 0.7711 | 1.030 | 0.08 | 0.0337 | 0.794 |
| 2 | 0.7667 | 1.027 | 0.075 | 0.0336 | 0.787 |
| 3 | 0.7693 | 1.007 | 0.087 | 0.0325 | 0.775 |
| 4 | 0.6155 | 0.971 | 0.062 | 0.0319 | 0.598 |
| 5 | 0.7526 | 0.972 | 0.057 | 0.0326 | 0.731 |
| 6 | 0.8024 | 0.970 | 0.066 | 0.0326 | 0.778 |
| 7 | 0.7797 | 1.035 | 0.056 | 0.0333 | 0.807 |
| 8 | 0.8134 | 1.014 | 0.054 | 0.0329 | 0.824 |
| 9 | 0.8297 | 1.030 | 0.067 | 0.0323 | 0.854 |
| 10 | 0.7643 | 1.058 | 0.056 | 0.0336 | 0.808 |
| 11 | 0.762 | 1.047 | 0.055 | 0.0335 | 0.797 |
| 12 | 0.8259 | 1.051 | 0.071 | 0.0345 | 0.868 |

The color properties for Examples 1-12 are listed in TABLE 5. The measurements were made at a glass thickness of 3.9 mm (0.1535 inches). With respect to the color data provided in TABLE 5, the glass color in terms of dominant wavelength and excitation purity was measured using C.I.E. standard illuminant "C" with a 2° observer, following the procedures established in ASTM E308-90. Glass color in terms of L*, a* and b* was determined using the reference illuminant (D65) with a 10° observer.

TABLE 5

| Examples | DW (nm) | Pe | L* | a* | b* |
|---|---|---|---|---|---|
| 1 | 586.63 | 94.55 | 2.53 | 3.9 | 4.18 |
| 2 | 585.07 | 98.61 | 4.17 | 5.78 | 7.12 |
| 3 | 587.21 | 91.25 | 2.38 | 3.74 | 3.82 |
| 4 | 477.44 | 47.97 | 57.5 | −6.85 | −36.37 |
| 5 | 574.37 | 93.34 | 23.21 | 0.78 | 44.81 |
| 6 | 583.42 | 99.1 | 6.74 | 8.2 | 11.55 |
| 7 | 579.18 | 98.28 | 13.16 | 5.98 | 39.51 |
| 8 | 581.52 | 98.95 | 8.53 | 7.2 | 34.55 |
| 9 | 584.82 | 99.54 | 3.19 | 4.37 | 5.48 |
| 10 | 577.96 | 97.42 | 14.72 | 4.89 | 39.88 |
| 11 | 577.91 | 97.65 | 14.83 | 4.84 | 40.54 |
| 12 | 584.93 | 99.37 | 2.47 | 3.44 | 4.25 |

The solar properties of the Examples 1-12 were measured as discussed above and are listed in TABLE 6 below:

TABLE 6

| Sample | TSET % | TSER % | TSEA % | Lta % | Solar Factor % |
|---|---|---|---|---|---|
| 1 | 0.98 | 4.09 | 94.93 | 0.38 | 27.0 |
| 2 | 1.08 | 4.1 | 94.82 | 0.61 | 27.0 |
| 3 | 1.01 | 4.05 | 94.94 | 0.35 | 27.0 |
| 4 | 16.66 | 4.37 | 78.97 | 20.43 | 38.3 |
| 5 | 2.54 | 4.08 | 93.38 | 4.5 | 28.1 |
| 6 | 1.23 | 4.07 | 94.7 | 0.97 | 27.1 |
| 7 | 1.47 | 4.11 | 94.42 | 1.97 | 27.3 |
| 8 | 1.17 | 4.1 | 94.73 | 1.21 | 27.1 |
| 9 | 0.82 | 4.08 | 95.1 | 0.47 | 26.8 |
| 10 | 1.58 | 4.14 | 94.28 | 2.27 | 27.4 |
| 11 | 1.6 | 4.14 | 94.26 | 2.29 | 27.4 |
| 12 | 0.75 | 4.15 | 95.1 | 0.36 | 26.8 |

Examples 1-3 and 5-12 have a solar factor of less than 30% and an Lta in the range of greater than 0 and less than 5%. More particularly, Examples 1-3, 6, 9 and 12 have an Lta in the range of greater than 0 and less than 1%. As is now appreciated, these glasses will pass low percentages of visible light. Examples 7 and 8 have an Lta in the range of 1 to 2% and pass more visible light than Examples 1-3, 6, 9 and 12. Examples 10 and 11 have an Lta in the range of 2-3% and pass more visible light than Examples 7 and 8. Example 5 has an Lta of 4.5% and passes more visible light than the examples 1-4 and 6-12. In the practice of the invention, Examples 5, 7, 10 and 11 having an Lta in the range of 1.9 to 4.5, and a solar factor of equal to or less than 30% are preferred.

Example 4 has a solar factor of 38% which is greater than 30% and does not meet the solar factor of equal to or less than 30% proposed by CARB. It is believed the solar factor is greater than 30% because the Lta is 20.43% and the TSET is 16,66%. It is believed that the high solar factor and high Lta was a result of low additions of CoO (0.0319 wt %), a low FeO (0.598 wt %) which resulted in low additions of the blue colorant and low amounts of ferric sulfides.

As can be appreciated by those skilled in the art, when the dark privacy glass of the invention is used as an automotive window, it is preferably tempered and/or heat strengthened as know in the art to meet automotive safety requirements.

Based on the description of the embodiments of the invention, it can be appreciated that this invention is not limited to the particular embodiments disclosed, but it is intended to cover modifications that are within the spirit and scope of the invention, as defined by the appended claims.

What is claimed is:

1. A glass comprising:
   a base soda-lime-silica glass portion;
   a colorant portion, comprising:

| | |
   |---|---|
   | total iron as $Fe_2O_3$ | equal to or greater than 0.900 weight percent; |
   | FeO | equal to or greater than 0.50 weigh percent; |
   | CoO | greater than 0.030 weight percent; |
   | Redox ratio | equal to or greater than 0.50, | and wherein color of the glass in terms of L*, a* and b* using reference illuminant (D65) with a 10° observer is L* in the range of 2.38-23.21; a* in the range of 3.44-7.2, and b* in the range of 3.82-44.81, and an excitation purity (PE) in the range of 91.25-99.54.

2. The glass according to claim 1, wherein the glass comprises a first major surface and an opposite second major surface, and following assigned values to determine the solar factor of the glass in accordance with the International Organization for Standardization No. 13837:
   emissivity of the first surface 0.837,
   emissivity of the second surface 0.837,
   heat transfer coefficient of the first surface 21 watts/square meter Kelvin,
   heat transfer coefficient of the second surface 8 watts/square meter Kelvin,
   wherein the solar factor of the glass is determined in accordance with the International Organization for Standardization No. 13837 at a wind speed of 4 meters per second.

3. The glass according to claim 2, wherein the glass is a window for a land, air, space, on water and under water vehicle: for residential and commercial structures, and for residential and commercial doors, oven doors and see through refrigerator doors.

4. The glass according to claim 3, wherein the glass is the glass of a roof window for a vehicle,
   wherein the glass has a visible fight transmission ("Lta") (C.I.E. illuminant A) of greater than 0% and equal to or less than 15% at a glass thickness of 3.9 mm and in a wavelength range of greater than 380 nm to less than 780 nm.
   wherein the base soda-lime-silica glass portion, comprises

| | |
   |---|---|
   | $SiO_2$ | 66-75 weight percent; |
   | $Na_2O$ | 10-20 weight percent; |
   | CaO | 5-15 weight percent; |
   | MgO | 0-5 weight percent; |
   | $Al_2O_3$ | 0-5 weight percent; |
   | $K_2O$ | 0-3 weight percent, and |
   | BaO | 0-1 weight percent. | wherein the colorant portion, comprises:

| | |
   |---|---|
   | total iron as $Fe_2O_3$ | equal to or greater than 0.950 weight percent; |
   | FeO | equal to or greater than 0.50 weight percent; |
   | CoO | greater than 0.030 weight percent; |
   | Redox ratio | equal to or greater than 0.50. |

5. The glass according to claim 4, wherein the glass is tempered or heat strengthened.

6. The glass according to claim 2 wherein the thickness of the glass is 3.9 mm.

7. The glass according to claim 1, wherein the base soda-lime-silica glass portion, comprises:
   $SiO_2$ 66-75 weight percent;
   $Na_2O$ 10-20 weight percent; and
   CaO 5-15 weight percent.

8. The glass according to claim 7 wherein the colorant portion, consists essentially of:

| | |
   |---|---|
   | total iron as $Fe_2O_3$ | in the range of 0.900 to 1.3 weight percent; |
   | FeO | in the range of 0.50-0.900 weight percent; |
   | CoO | greater than 0.030 weight percent; |
   | Redox ratio | equal to or greater than 0.50-0.850. |

9. The glass according to claim 1 wherein the colorant portion provides the glass with a TSET of greater than 0% and equal to or less than 5%, a TSER of greater than 3% and equal to or less than 7%, and a TSEA of greater than 90% and equal to or less than 97%, and selected ones of the TSET, TSER, and TSEA are measured over a wavelength range of 300 to 2500 nanometers ("nm") at a glass thickness in the range of 3.6-4.1 millimeters ("mm").

10. The glass according to claim 9 wherein the glass has a visible light transmission [2 degree observer] ("Lta") (C.I.E. illuminant A) of greater than 0% and equal to or less than 15% at a glass thickness of 3.9 mm and in a wavelength range of greater than 380 nm to less than 780 nm.

11. The glass according to claim 10 wherein the visible light transmission is in the range of greater than 0% to 10%.

12. The glass according to claim 11 wherein the visible light transmission is in the range of greater than 0% to 3%.

13. The glass according to claim 12 wherein the thickness is selected from the group of 3.6 mm, 3.9 mm and 4.1 mm.

14. The glass according to claim 9 wherein the glass has a TSET of greater than 1% and equal to or less than 5%, a TSER of greater than 3% and equal to or less than 5%, and a TSE, of greater than 92% and equal to or less than 95%.

15. A glass comprising;
    a base soda-lime-silica glass portion;
    a colorant portion, comprising:
      total iron as $Fe_2O_3$ equal to or create than 0.950 weight percent;
      FeO equal to or greater than 0.50 weight percent;
      CoO greater than 0.030 weight percent;
      Redox ratio equal to or greater than 0.50
    wherein the colorant portion provides the glass with a TSET of greater than 0% and equal to or less than 5%, a TSER of greater than 3% and equal to or less than 7%, and a TSEA of greater than 90% and equal to or less than 97%, and selected ones of the TSET, TSER, and TSEA are measured over a wavelength of 300 to 2500 nanometers ("nm") at a glass thickness in the range of 3.6-4.1 millimeters ("mm") and
    wherein color of the glass in terms of L*, a* and b* using reference illuminant (D65) with a 10 ° observer is L* in the range of 2.38-23.21; a* in the range of 3.44-7.2, and b* in the range of 3.82-44.81, and an excitation purity (PE) in the range of 91.25-99.54.

16. A glass for a roof window for a vehicle, wherein the glass has a first major surface and an opposite second major surface, comprising:
    a base soda-lime-silica glass portion, comprising:

| | |
    |---|---|
    | $SiO_2$ | 66-75 weight percent; |
    | $Na_2O$ | 10-20 weight percent; |
    | CaO | 5-15 weight percent; |

| | |
|---|---|
| MgO | 0-5 weight percent; |
| Al₂O₃ | 0-5 weight percent; |
| K₂O | 0-3 weight percent, and |
| BaO | 0-1 weight percent, | a colorant portion, comprising:
total iron as $Fe_2O_3$ equal to or greater than 0.950 weight percent;
FeO equal to or greater than 0.50 weight percent;
CoO greater than 0.030 weight percent;
Redox ratio equal to or greater than 0.50,
wherein the colorant portion provides the glass with a solar factor of equal to or less than 30% at a glass thickness in the range of 3.6 to 4.1 millimeters ("mm"), wherein the solar factor is calculated in accordance to the International Organization for Standardization No. 13837;
wherein a first set of properties of the glass and assigned values to the first set of properties to determine the solar factor of the glass in accordance with the International Organization for Standardization No. 13837 comprises:

| | |
|---|---|
| emissivity of the first surface | 0.837, |
| emissivity of the second surface | 0.837, |
| wind speed | 4 meters per second, |
| heat transfer coefficient of the first surface | 21 watts/square meter Kelvin, |
| heat transfer coefficient of the second surface | 8 watts/square meter Kelvin |
| glass thickness | 3.6-4.1 mm, and | wherein a second set of properties of the glass to determine the solar factor of the glass in accordance with the International Organization for Standardization No. 13837 comprises:
total solar energy transmittance ("TSET") in the range of greater than 0% and equal to or less than 5%;
total solar energy reflected ("TSER") in the range of greater than 3% and equal to or less than 7%; and
total solar energy absorbed ("TSEA") in the range of grater than 90% and equal to or less than 97%;
wherein the TSET, TSER and TSEA are determined at a glass thickness in the range of 3.6-4.1 mm and selected ones of the TSET, TSER and TSEA are measured over a wavelength of 300 to 2500 mm at a glass thickness of 3.9 mm,
wherein the glass has a visible light transmission ("Lta") (C.I.E. illuminant A) of greater than 0% and equal to or less than 15% at a glass thickness of 3.9 mm and in a wavelength range of greater than 380 nm to less than 780 nm, and
wherein color of the glass in terms of $L^*$, $a^*$ and $b^*$ using reference illuminant (D65) with a 10° observer is $L^*$ in the range of 2.38-23.21; $a^*$ in the range of 3.44-7.2, and $b^*$ in the range of 3.82-44.81, and an excitation purity (PE) in the range of 91.25-99.54.

17. The glass according to claim 16 comprising Our expressed as $SO_3$ in the range of 0.04 to 0.10 weight percent.

* * * * *